(No Model.)
C. W. RICHARDSON.
BAKE PAN.
No. 497,606. Patented May 16, 1893.
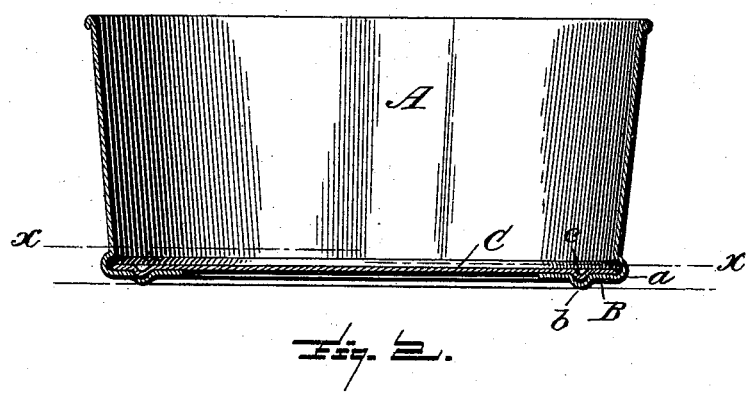
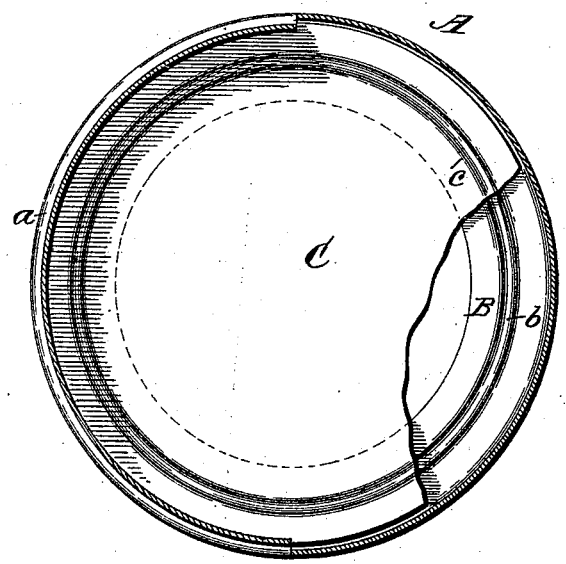
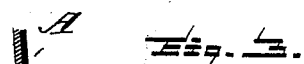
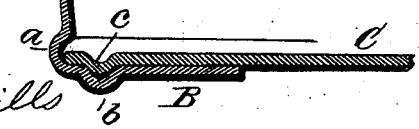
Witnesses
L. C. Hills
J. H. Ingalls
Inventor
Clinton W. Richardson
per Chas. N. Fowler
Attorney
THE NORRIS PETERS CO., PHOTO-LITHO., WASHINGTON, D. C.

United States Patent Office.

CLINTON W. RICHARDSON, OF BATH, NEW YORK.

BAKE-PAN.

SPECIFICATION forming part of Letters Patent No. 497,606, dated May 16, 1893.

Application filed January 25, 1893. Serial No. 459,748. (No model.)

*To all whom it may concern:*

Be it known that I, CLINTON W. RICHARDSON, a citizen of the United States, residing at Bath, in the county of Steuben and State of New York, have invented certain new and useful Improvements in Bake-Pans; and I do hereby declare that the following is a full, clear, and exact description of the same, reference being had to the annexed drawings, making a part of this specification, and to the letters of reference marked thereon.

The present invention has relation to that class of bake-pans in which the bottom is removable so as to facilitate the removal of the loaf of bread or cake without danger of breaking or other injury thereto, and the object thereof is to improve this class of bake-pans whereby the removable bottom is securely held in place and any possibility of the batter leaking through to the oven is prevented. These objects I attain by the construction substantially as shown in the drawings and hereinafter described and claimed.

Figure 1 of the drawings represents a sectional elevation of the improved bake-pan; Fig. 2 a bottom plan view partly in section and taken on line $xx$ of Fig. 1. Fig. 3 represents a detail sectional elevation.

In the accompanying drawings A represents the bake-pan of any of the usual forms and of any required size and like the class of pans to which this invention relates, is bottomless with an inwardly extending supporting rim B. So far as described the pan differs in no respect from those now in use, such pans having the usual removable bottom C.

In order to more securely hold the removable bottom in place and prevent danger of the batter leaking through, I provide the pan at the juncture of the supporting rim B and the lower edge of the body of the pan, with a circumferential groove $a$ to receive the edge of the removable bottom C. The rim B has a circumferential groove $b$ in which fits the flange or bead $c$ upon the under side of the bottom C, said flange or bead also the grooves being of any suitable size and shape found best adapted to the purpose. The flange or bead which is preferably made by a suitable grooving machine used by tinsmiths, materially strengthens the bottom and renders the bottom near its edge less liable to warp or buckle by the heat. The groove in the supporting flange B also forms a flange or bead upon the under side of the same so that the bottom of the pan will be slightly raised from the bottom of the oven and thus prevent any liability to bake too hard the bottom of the cake or bread. The edge of the removable bottom is sprung into the groove in the side of the body of the pan and in connection with the groove upon the supporting flange will provide against the batter leaking through onto the oven. The bead in the supporting flange as well as the bead in the removable bottom perform a double function in that they prevent leakage and also materially strengthen the flange and removable bottom to resist the danger of warping or "buckling" of the metal by the heat of the oven. The bead in the supporting flange also serves to support the under side of the pan above the bottom of the oven so that it will not come in contact therewith to burn or bake too hard the bottom of the bread or cake.

Having now fully described my invention, what I claim as new, and desire to secure by Letters Patent, is—

A bottomless bake-pan having an inwardly extending supporting flange provided with a circumferential bead to form both a groove and a shoulder upon the upper and under sides thereof respectively, a groove at the juncture of the flange and body of the pan, and a removable bottom having a bead to fit the groove in the flange, substantially as and for the purpose set forth.

In testimony that I claim the above I have hereunto subscribed my name in the presence of two witnesses.

CLINTON W. RICHARDSON.

Witnesses:
J. F. PARKHURST,
J. MCMASTER.